(12) United States Patent
Kang et al.

(10) Patent No.: US 7,667,873 B2
(45) Date of Patent: Feb. 23, 2010

(54) APPARATUS AND METHOD FOR IMAGE-ADAPTIVE COLOR REPRODUCTION USING PIXEL FREQUENCY INFORMATION IN PLURAL COLOR REGIONS AND COMPRESSION-MAPPED IMAGE INFORMATION

(75) Inventors: Byoung-ho Kang, Yongin-si (KR); Heui-keun Choh, Yongin-si (KR); Min-ki Cho, Yongin-si (KR); Se-eun Kim, Yongin-si (KR); Ronnier Luo, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 518 days.

(21) Appl. No.: 11/714,784

(22) Filed: Mar. 7, 2007

(65) Prior Publication Data
US 2007/0211272 A1 Sep. 13, 2007

(30) Foreign Application Priority Data
Mar. 7, 2006 (KR) ............. 10-2006-0021508

(51) Int. Cl.
*H04N 1/56* (2006.01)
*H04N 1/60* (2006.01)
*G06T 5/00* (2006.01)

(52) U.S. Cl. .................. 358/1.9; 358/3.24; 358/518; 358/522; 382/167; 382/254; 345/590; 345/604

(58) Field of Classification Search .......... 358/1.9, 358/3.24, 518–523; 382/162, 167, 168, 254, 382/274; 345/590, 591, 600–604
See application file for complete search history.

(56) References Cited

U.S. PATENT DOCUMENTS

| 5,883,632 | A | 3/1999 | Dillinger |
| 6,414,690 | B1* | 7/2002 | Balasubramanian et al. 382/167 |
| 6,646,762 | B1 | 11/2003 | Balasubramanian et al. |
| 6,657,746 | B1* | 12/2003 | Fuchigami et al. ........... 358/1.9 |
| 6,719,392 | B2 | 4/2004 | Qiao |
| 6,724,935 | B1 | 4/2004 | Sawada et al. |
| 6,954,287 | B1* | 10/2005 | Balasubramanian et al. . 358/1.9 |

(Continued)

FOREIGN PATENT DOCUMENTS

JP 10-200774 A 7/1998

(Continued)

*Primary Examiner*—Scott A Rogers
(74) *Attorney, Agent, or Firm*—Sughrue Mion, PLLC (57) ABSTRACT

An apparatus and method for image-adaptive color reproduction is provided. The apparatus includes an information-extraction unit, an image-compression unit and an image-information-reproduction unit. The information-extraction unit inputs image information of a first color space model, converts the input image information into image information of a second color space model, and extracts pixel frequency information of pixels belonging to a plurality of color regions by using the image information of the second color space model. The image compression unit inputs the image information of the first color space model, converts the input image information into the image information of the second color space model, and calculates compressed image information by compression-mapping the image information of the second color space model. The image information reproduction unit outputs final image information by using the pixel frequency information and the compressed image information.

17 Claims, 11 Drawing Sheets

U.S. PATENT DOCUMENTS

| | | | |
|---|---|---|---|
| 7,426,312 B2 * | 9/2008 | Dance et al. | 382/254 |
| 2007/0188786 A1 * | 8/2007 | Kim et al. | 358/1.9 |
| 2008/0174798 A1 * | 7/2008 | Cho et al. | 358/1.9 |
| 2009/0087091 A1 * | 4/2009 | Hatori | 382/167 |

FOREIGN PATENT DOCUMENTS

| | | |
|---|---|---|
| JP | 2002-272268 A | 9/2002 |
| JP | 2003-143622 A | 5/2003 |
| KR | 10-2002-0050071 A | 6/2002 |

\* cited by examiner

APPARATUS AND METHOD FOR IMAGE-ADAPTIVE COLOR REPRODUCTION USING PIXEL FREQUENCY INFORMATION IN PLURAL COLOR REGIONS AND COMPRESSION-MAPPED IMAGE INFORMATION

CROSS-REFERENCE TO RELATED APPLICATION

This application claims priority from Korean Patent Application No. 10-2006-0021508 filed on Mar. 7, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to color reproduction, and more particularly, to image-adaptive color reproduction, which can reproduce optimal image-adaptive colors.

2. Description of the Related Art

Digital imaging apparatuses for reproducing colors, such as monitors, scanners, printers are of high quality, have been provided with diversified functions in order to satisfy various user demands, and use different color spaces or color models according to respective application fields. Color space models can be divided into device-dependent models and device-independent models. The former includes the Red, Green, Blue (RGB) model, which is a kind of additive color space model, and a Cyan, Magenta, Yellow, Black (CMYK) color space model, which is a kind of subtractive color space model. The latter includes the Commission Internationale d'Eclairage (CIE) Lab model, CIE XYZ model, CIE LUV model and so forth. The CMYK color space model is mainly used in the printing field, and the RGB color space model is mainly used in fields employing a computer monitor.

Information regarding an image that is viewed through imaging equipment cannot completely represent real colors. Thus, imaging equipment represents colors by removing visually unperceivable portions, and providing more information regarding visually perceivable portions or portions exhibiting perceivable color differences. Particularly, since the human visual system is most sensitive to luminance changes, the picture quality of a printer is generally affected by changing luminance and adjusting luminance contrast.

With respect to luminance reproduction, several related art methods have been disclosed, including a method in which separate luminance regions are established and the established luminance regions are compressed in different directions from region to region (U.S. Pat. No. 5,883,632), a luminance reproduction method using a low-pass filter (U.S. Pat. No. 6,646,762), and a method in which contrast is selectively extended and simultaneously hues are preserved according to input video signal levels (Korean Patent Application No. 2002-0050071). However, these related art methods have a problem in that they use a single algorithm for the luminance reproduction, which makes it impossible to reproduce image-adaptive colors.

Also, several luminance-saturation remapping methods have been disclosed, including a method in which a gamut is mapped by adjusting a Lookup Table (LUT) in an image processing process (U.S. Pat. No. 6,724,935), and a method in which a gamut of each device is comparison-mapped in a device-independent space (U.S. Pat. No. 6,719,392). However, theses related art methods have a problem in that an image is reproduced on a pixel-by-pixel basis, and thus color reproduction is carried out without considering the relationship between each pixel and its surrounding pixels.

That is, the related art methods are problematic in that image reproduction is accompanied by a great difference in image quality because a single algorithm is applied to images having different characteristics, and color reproduction is performed without regard for the harmonization of surrounding colors due to color processing on a pixel-by-pixel basis.

SUMMARY OF THE INVENTION

Accordingly, exemplary embodiments of the present invention have been made to overcome the above-mentioned disadvantages occurring in the related art and other disadvantages not described above. Also, the present invention is not required to overcome the disadvantages described above, and an exemplary embodiment of the present invention may not overcome any of the problems described above.

The present invention provides an apparatus and a method for image-adaptive color reproduction, which can reproduce optimal image-adaptive colors by analyzing image components and by considering surrounding pixels.

In accordance with one aspect of the present invention, there is provided an apparatus for image-adaptive color reproduction, the apparatus including: an information-extraction unit inputting therein image information of a first color space to convert the input image information of the first color space into image information of a second color space, and extracting pixel frequency information of pixels belonging to a plurality of color regions, which are divided according to predetermined criteria, by using the image information of the second color space; an image compression unit inputting therein the image information of the first color space to convert the input image information of the first color space into the image information of the second color space, and calculating compressed image information by compression-mapping the image information of the second color space; and an image information reproduction unit outputting final image information by using the pixel frequency information and the compressed image information.

In accordance with another aspect of the present invention, there is provided a method for image-adaptive color reproduction, the method including: inputting image information of a first color space to convert the input image information of the first color space into image information of a second color space, and extracting pixel frequency information of pixels belonging to a plurality of color regions, which are divided according to predetermined criteria, by using the image information of the second color space; inputting the image information of the first color space to convert the input image information of the first color space into the image information of the second color space, and calculating compressed image information by compression-mapping the image information of the second color space; and outputting final image information by using the pixel frequency information and the compressed image information.

BRIEF DESCRIPTION OF THE DRAWINGS

The aspects, features and advantages of the present invention will be apparent from the following detailed description of exemplary embodiments taken in conjunction with the accompanying drawings, in which.

DETAILED DESCRIPTION OF THE EXEMPLARY EMBODIMENTS

Aspects of the present invention, and ways to achieve them will be apparent from a description of various exemplary embodiments of the present invention, described below with reference to the accompanying drawings. However, the scope of the present invention is not limited to such exemplary embodiments and the present invention may be realized in various forms. The exemplary embodiments disclosed in the specification are nothing but examples provided to describe the present invention and assist those skilled in the art to completely understand the present invention. The present invention is defined only by the scope of the appended claims. Also, the same reference numerals are used to designate the same elements throughout the specification and drawings.

Hereinafter, exemplary embodiments of the present invention will be described in detail with reference to block diagrams and flowcharts for explaining an apparatus and a method for image-adaptive color reproduction consistent with the present invention.

Figure 1:
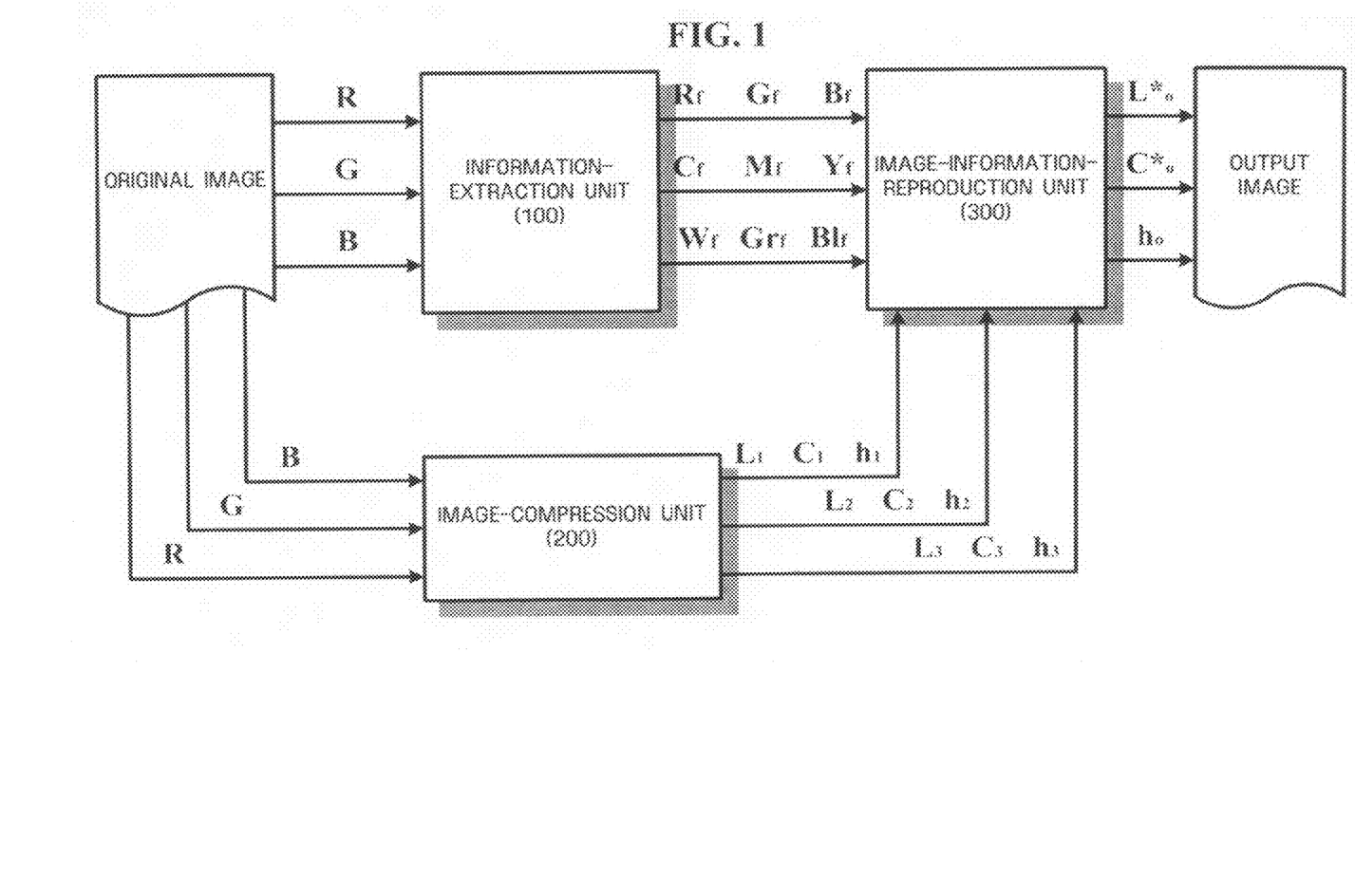
FIG. 1 is a block diagram illustrating an overall structure of an apparatus for image-adaptive color reproduction in accordance with an exemplary embodiment of the present invention.

FIG. 1 illustrates an overall structure of an apparatus for image-adaptive color reproduction according to an exemplary embodiment of the present invention.

Referring to FIG. 1, an exemplary apparatus for image-adaptive color reproduction includes an information-extraction unit 100 and an image compression unit 200, into each of which image information is input from an original image, and an image information reproduction unit 300 into which information is input from the information-extraction unit 100 and the image compression unit 200, and which outputs an image after performing matrix operations.

The information-extraction unit 100, into which image information of a first color space model is input from the original image, converts the input image information of the first color space model into image information of a second color space model. The information-extraction unit 100 then extracts pixel frequency information of pixels belonging to a plurality of color regions, which are divided according to predetermined criteria, by using the image information of the second color space model. The image compression unit 200, into which the image information of the first color space model are also input from the original image, converts the input image information of the first color space model into the image information of the second color space model. The image compression unit 200 then calculates compressed image information by compression-mapping the image information of the second color space model. The image information reproduction unit 300 outputs final image information by using the pixel frequency information extracted by the information-extraction unit 100 and the compressed image information calculated by the image compression unit 200.

In the following description of exemplary embodiments of the present invention, for the convenience of explanation, the image information of the first color space model will be assumed to be R, G and B values of an RGB color space model, and the image information of the second color space model will be assumed to be luminance (L*) information, saturation or chroma (C*) information and hue (h) information of a CIE_Lab color space model. However, it should be noted that this is only an example provided to explain the exemplary embodiments of the present invention, and the scope of the present invention is not limited thereto.

Figure 2:
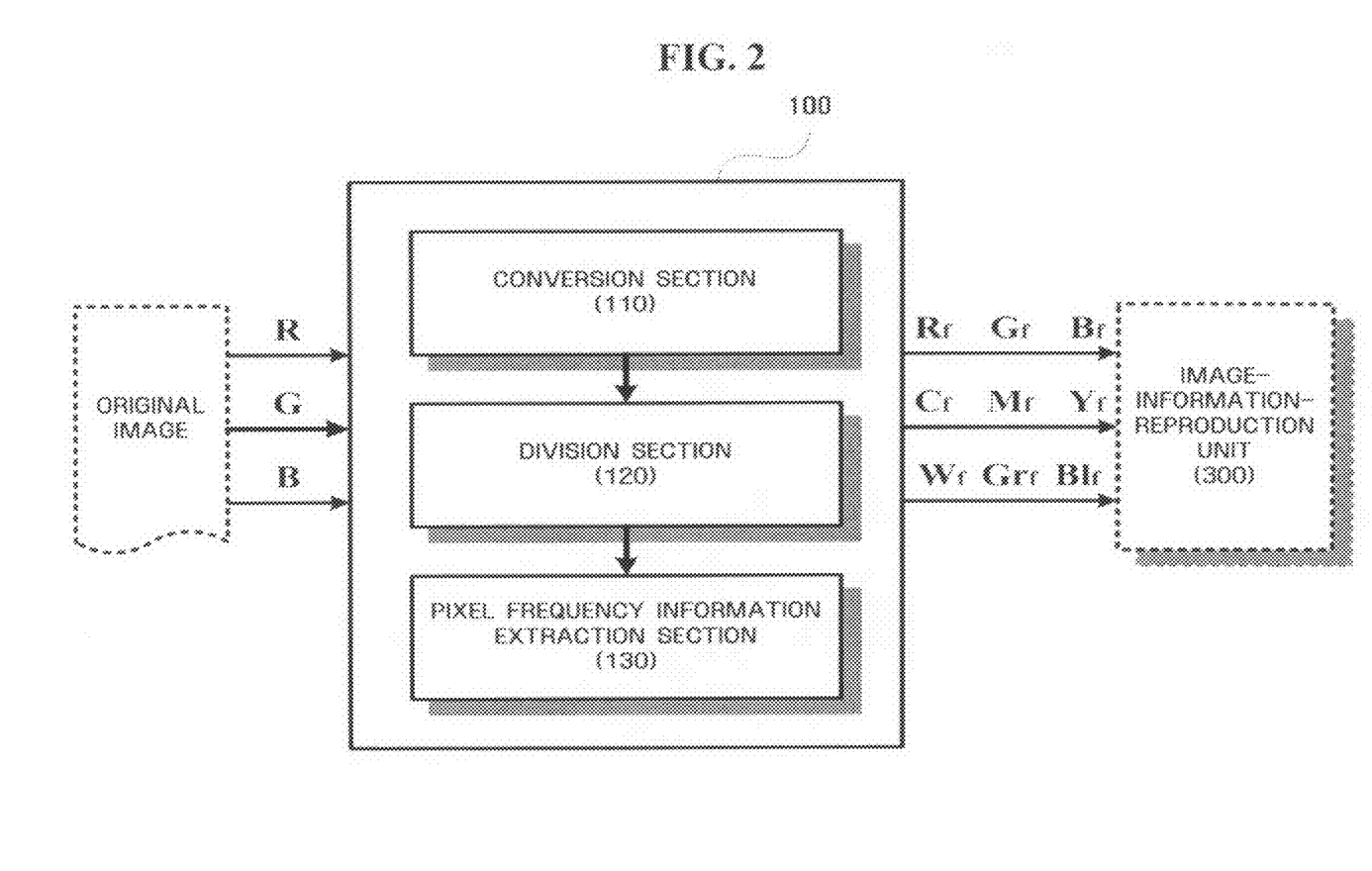
FIG. 2 is a block diagram illustrating a structure of an information-extraction unit in accordance with an exemplary embodiment of the present invention.
Figure 3A:
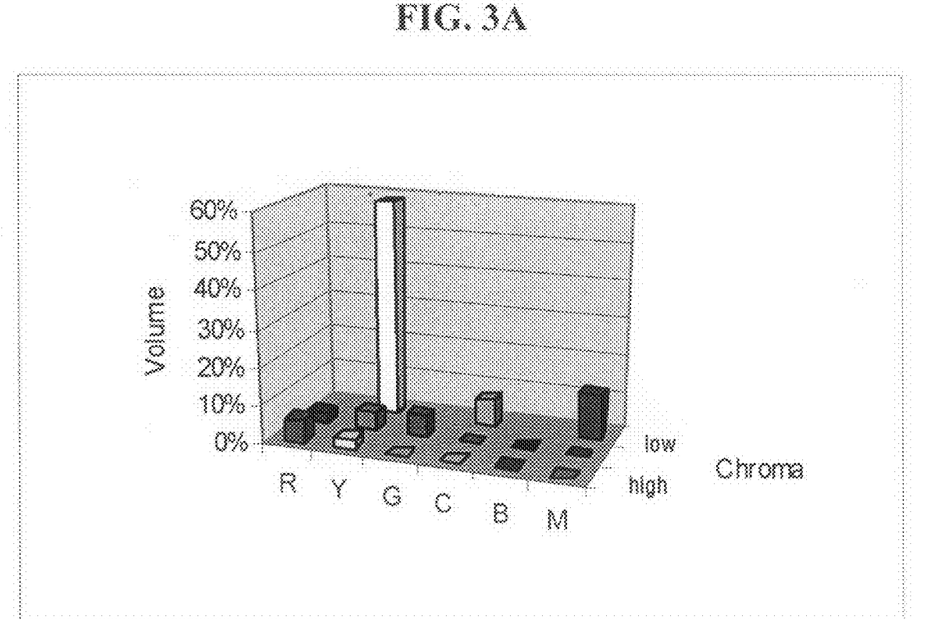
FIG. 3A and FIG. 3B are three-dimensional (3D) histograms representing pixel frequency information extracted by the information-extraction unit in FIG. 2 in accordance with an exemplary embodiment of the present invention.
Figure 3B:
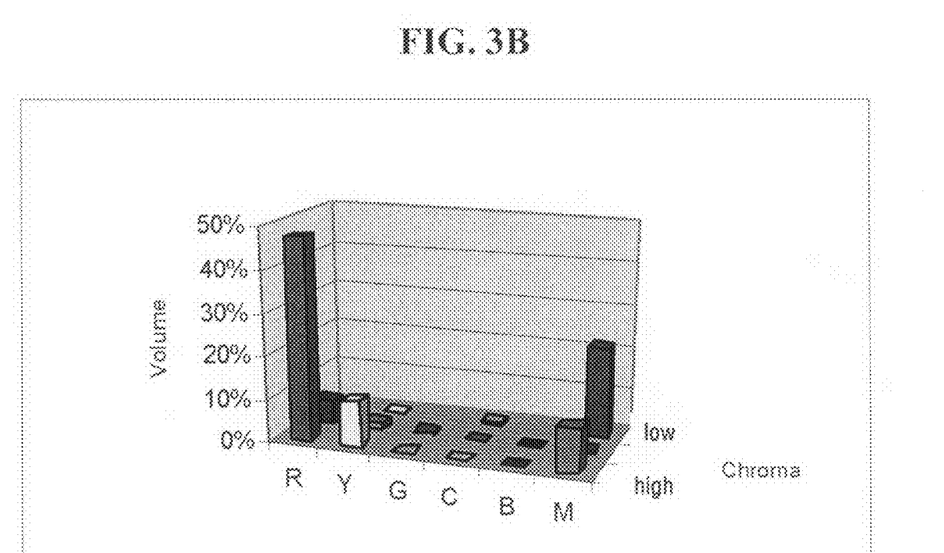

Reference will now be made in detail to the information-extraction unit 100 with reference to FIG. 2 and FIG. 3. FIG. 2 illustrates a structure of an information-extraction unit according to an exemplary embodiment of the present invention, and FIG. 3A and FIG. 3B are 3D histograms representing pixel frequency information extracted by the information-extraction unit 100.

As illustrated in FIG. 2, the information-extraction unit 100 includes a conversion section 110, a division section 120 and a pixel frequency information extraction section 130. The conversion section 110, into which R, G and B values are input from an original image, converts the input R, G and B values into, for example, luminance (L*) information, saturation or chroma (C*) information and hue (h) information of a CIE_Lab color space model by means of a CIE standard conversion formula. Luminance, indicating color luminosity, is designated by "L*", chroma (or saturation), indicating the degree of color definition, is designated by "C*", and hue, indicating a color name necessary for color distinction, is designated by "h."

After the conversion section 110 converts the input R, G and B values into the image information of the CIE_Lab color space model, the division section 120 divides the color space model into nine color regions of Red (R), Yellow (Y), Green (G), Cyan (C), Blue (B), Magenta (M), White (W), Grey (Gr) and Black (Bl) based on the converted h information and the converted L* information, and subdivides each of the divided nine color regions into regions of high chroma, middle chroma and low chroma based on the converted C* information. According to an example in which the nine color regions are divided based on the h information and the L* information, division criteria may be $356.5 < h < 59.0$ for Red, $59.0 < h < 128.0$ for Yellow, $128.0 < h < 180.5$ for Green, $180.5 < h < 226.0$ for Cyan, $226.0 < h < 291.0$ for Blue, $291.0 < h < 356.5$ for Magenta, $100.0 < L^* < 75.0$ for White, $75.0 < L^* < 25.0$ for Grey and $25.0 < L^* < 0$ for Black. According to an example in which the nine color regions are subdivided based on the C* information, division criteria may be $70 < C^*$ for high chroma, $30 < C^* < 70$ for middle chroma and $0 < C^* < 30$ for low chroma.

Thereafter, the pixel frequency information extraction section 130 calculates pixel frequency distributions of pixels belonging to the nine color regions, and extracts pixel frequency information of pixels belonging to the high and middle chroma regions, excluding the low chroma regions. As illustrated in the histograms of FIG. 3A and FIG. 3B, the abscissa axis denotes divided color regions, the ordinate axis denotes chroma, and the height of a histogram bar denotes pixel frequency of pixels belonging to each color region. Since the low chroma regions having no concern with color characteristics need not be mapped, only the pixel frequencies of pixels existing in the high and middle chroma regions need to be extracted. The extracted pixel frequencies are expressed by $R_f$, $G_f$, $B_f$, $C_f$, $M_f$, $Y_f$, $W_f$, $Gr_f$ and $Bl_f$, and information on these pixel frequencies are input into the image information reproduction unit 300 as will be described below.

Figure 4:
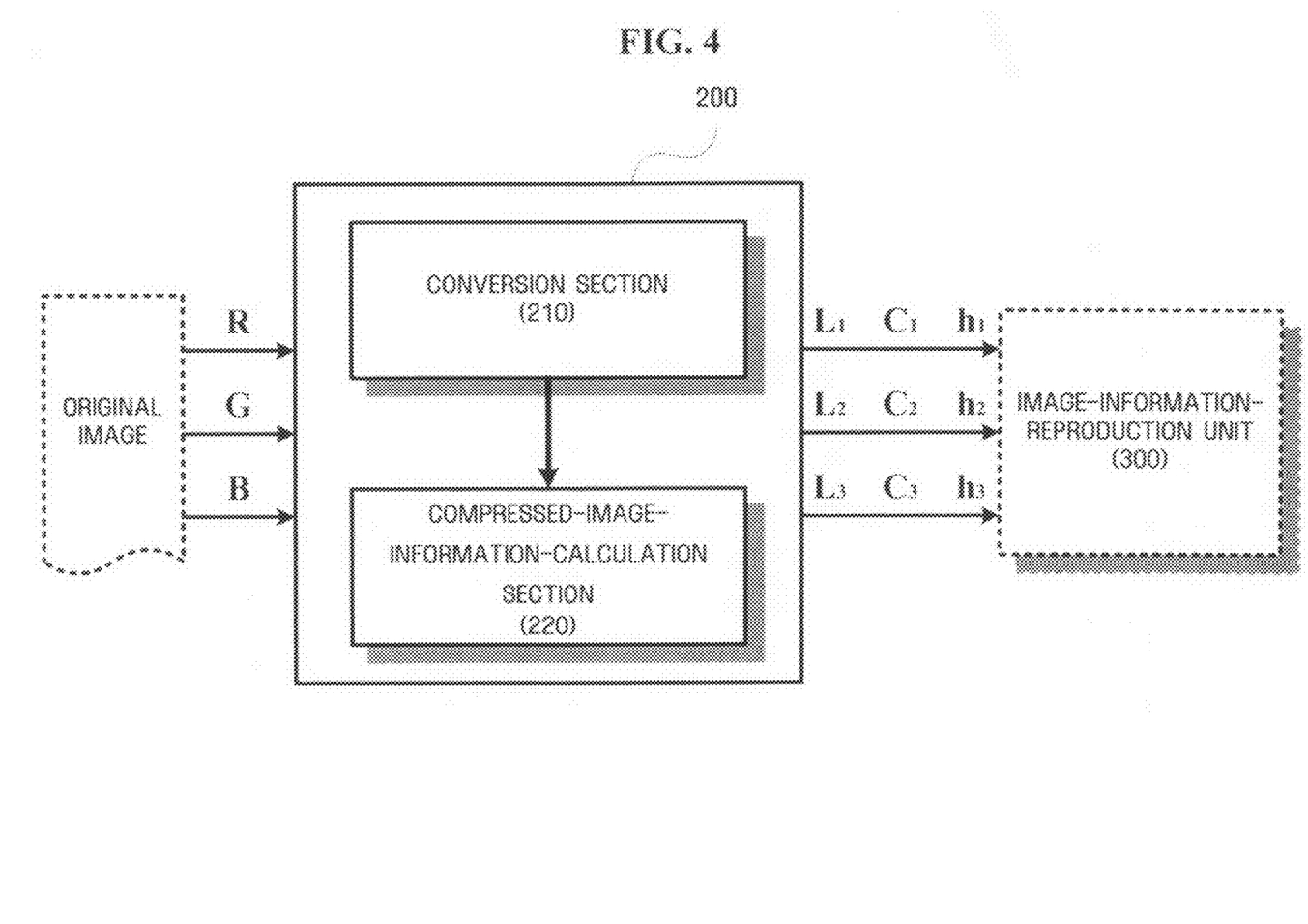
FIG. 4 is a block diagram illustrating a structure of an image compression unit in accordance with an exemplary embodiment of the present invention.

Reference will now be made in detail to the image compression unit 200 with reference to FIG. 4, FIG. 5, FIG. 6, FIG. 7A and FIG. 7B. FIG. 4 illustrates a structure of an image compression unit according to an exemplary embodiment of the present invention. As illustrated in the drawing, the image compression unit 200 includes a conversion section 210 and a compressed image information calculation section 220.

The conversion section 210, into which R, G and B values are input from an original image, converts the input R, G and B values into L* information, C* information and h information of a CIE_Lab color space model by means of a CIE standard conversion formula. The compressed image information calculation section 220 compression-maps the converted L*, C* and h information by using a plurality of algorithms. In an exemplary embodiment of the present invention, a gamut is compression-mapped using three algorithms: a minimum distance clipping algorithm, a variable region compression algorithm and a spatial-information-based compression algorithm, as a result of which, a total of nine sets of compressed image information $L^*_1$, $C^*_1$, $h_1$, $L^*_2$, $C^*_2$, $h_2$, $L^*_3$, $C^*_3$ and $h_3$ are calculated.

Here, a gamut or color gamut refers to, for example, a color reproduction range. Since a source gamut is ranged differently from a destination gamut, it is necessary to perform gamut mapping in order to match these two different gamuts. Such gamut mapping is generally divided into the following types:

The first type of gamut mapping is a Cusp mapping method, which is used when there is a great difference between Cusp positions of a source gamut and a destination gamut. In the Cusp mapping method, source data is mapped to the destination gamut in a direction in which a source Cusp becomes coincident with a destination Cusp. As used herein, the term Cusp refers to, for example, a maximum chroma value.

The second type of gamut mapping is a compression mapping method, which is used when there is a small difference between Cusp positions of a source gamut and a destination gamut, and the source gamut completely includes the destination gamut. In the compression mapping method, source data existing beyond the destination gamut is mapped to a boundary portion of the destination gamut. In exemplary embodiments of the present invention, the gamut mapping is mainly performed using the compression mapping method.

The third type of gamut mapping is an extension mapping method, which is used when there is a small difference between Cusp positions of a source gamut and a destination gamut, and the destination gamut completely includes the source gamut. In the extension mapping method, contrary to a clipping mapping method, data of the source gamut completely included in the destination gamut is mapped to the destination gamut by using the boundary ratio of the source gamut and the destination gamut.

Figure 5:
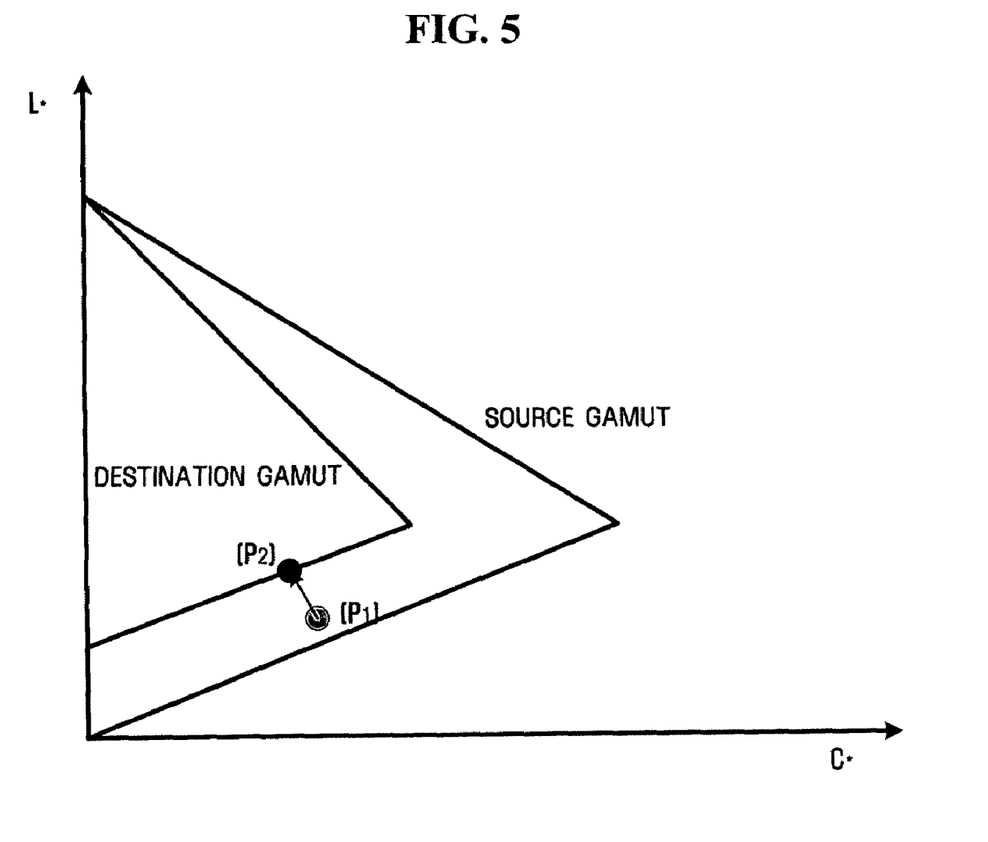
FIG. 5 is a graph illustrating a gamut-mapping process using a minimum distance clipping algorithm in accordance with an exemplary embodiment of the present invention.

FIG. 5 illustrates a gamut-mapping process using a minimum distance clipping algorithm according to an exemplary embodiment of the present invention. In FIG. 5, the abscissa axis denotes chroma (C*), and the ordinate axis denotes luminance (L*). A source gamut based on the converted L*, C* and h information of the CIE_Lab color space model, and a destination gamut to be reproduced (reproduction gamut) are depicted in a color space model defined by the abscissa and ordinate axes. According to the minimum distance clipping algorithm, a color point $P_2$ compressed by a minimum distance, that is, a color point having a minimum hue difference $\Delta E$ from an out-of-destination-gamut color point $P_1$ of the source gamut, is determined on a destination gamut boundary while hues, which exist within the destination gamut boundary, from among original image information existing in the source gamut, are preserved intact, and clipping mapping to the compressed color point $P_2$ is performed. In order to determine the compressed color point $P_2$, first of all, $\Delta E$ must be calculated. In a state where a hue is maintained constant, $\Delta E$ may be expressed by the square root of the sum of the squares of luminance and chroma differences between the compressed color point $P_2$ and the color point $P_1$ of the source gamut, that is, $\Delta E=[(\Delta L^*)^2+(\Delta C^*)^2]^{0.5}$. Then, $P_2$, a point at which a value of such an equation is minimal, is determined, and mapping to the determined point is performed.

Figure 6:
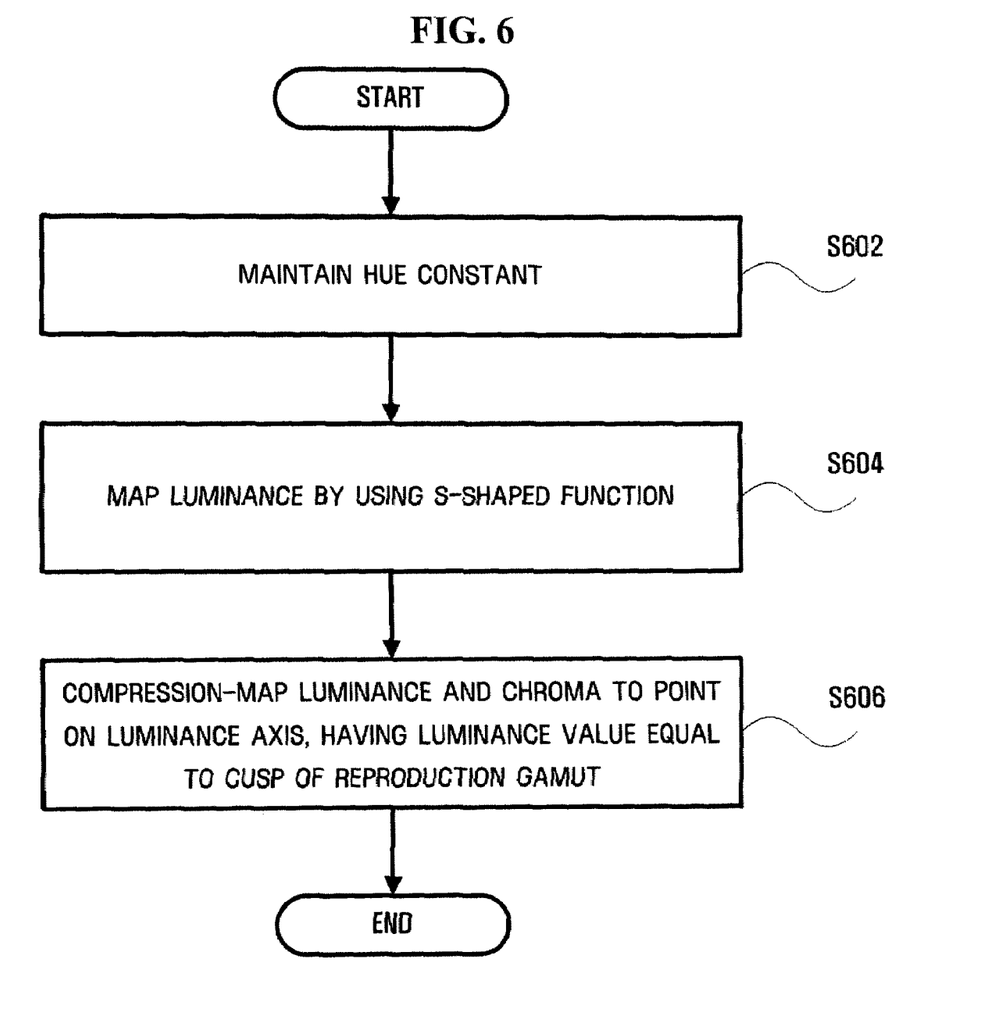
FIG. 6 is a flowchart illustrating a procedure of executing a variable region compression algorithm in accordance with an exemplary embodiment of the present invention.

FIG. 6 is a flowchart illustrating a procedure of executing a variable region compression algorithm according to an exemplary embodiment of the present invention. First, a hue perceived by an observer is maintained constant in operation S602. Then, luminance from among image information of a source gamut is mapped using an S-shaped function in operation S604. In order to use the S-shaped function, it is necessary to obtain information on determination variables of the S-shaped function, that is, information on the average and standard deviation of the S-shaped function. This can be achieved by determining parameters fitted to maximum luminance and minimum luminance of a printer through a Sigmoidal probability variable, which is a kind of S-shaped function. The average $x_0$ and the standard deviation $\Sigma$ as the determination variables of the S-shaped function are determined by means of an observer experiment-based LUT on the basis of average luminance and the reproduction width of input luminance. The observer experiment-based LUT may be diversely developed according to performance and functions of a printer and a user's visual sense. Through such an LUT, the average $x_0$ and the standard deviation $\Sigma$ of the S-shaped function are changed variably according to, or adaptively to, color reproduction characteristics of an I/O device. The variables $x_0$ and $\Sigma$ may be optimal parameters derived from an observer experiment or set according to the characteristics of a printer. Once the determination variables $x_0$ and $\Sigma$ are selected through the above-mentioned process, the Sigmoidal probability variable $S_i$ is calculated, which is expressed by the following equation:

$$S_i = \sum_{n=0}^{t} \frac{1}{\sqrt{2\pi\Sigma}} e^{\frac{(\frac{n}{m}x_0)^2}{2\Sigma^2}} \quad \text{(Equation 1)}$$

where, $x_0$ is an average in a normal distribution, $\Sigma$ is a standard deviation in the normal distribution, and m denotes the number of data used in an LUT. After the calculation of Equation 1, a normalization process as illustrated in the following equation is performed:

$$S_{LUT} = \frac{(S_i - \min(S))}{(\max(S) - \min(S))}(L^*_{max\_Out} - L^*_{Min\_Out}) + L^*_{Min\_Out} \quad \text{(Equation 2)}$$

Of parameters in Equation (2), min(S) is a minimum value of an LUT, max(S) is a maximum value of the LUT, $L^*_{max\_Out}$ is maximum luminance reproduced by a printer, and $L^*_{min\_Out}$ is minimum luminance reproduced by the printer. Using Equation 2, various combinations of S-shaped functions may be produced, and a user may select and apply any one from among the various S-shaped functions according to his/her visual sense.

After luminance is mapped in the above-mentioned manner, luminance and chroma must be compression-mapped to a point on a luminance axis, which has the same luminance value as that of a Cusp point of a reproduction gamut, by using a given function in operation S606. Here, the given function available for the luminance and chroma mapping is a knee function in the form of the following equation:

$$d_r = \begin{cases} d_o; & d_0 \le kd_{gr} \\ kd_{gr} + (d_o - kd_{gr})(1-k)d_{gr}/ \\ (d_{go} - kd_{gr}); & d_o > kd_{gr} \end{cases} \quad \text{(Equation 3)}$$

where, d denotes a distance from the Cusp point, subscript "g" denotes a gamut boundary, subscript "r" denotes a destination (or reproduction) gamut boundary, and subscript "o" denotes a source (or original) gamut boundary. Also, k may be expressed by k=iicr+min(iicr, 1−iicr)(icrs−mean(icrs)), wherein iicr (image in-gamut color ratio) denotes the ratio at which an image exists within a gamut, icrs (in-gamut color ratio for each segment) denotes the ratio at which a destination gamut accords with a source gamut. It is noted from the equation relating to k and Equation 3 that the greater the value that iicr or icrs has, the lower the ratio, at which current color is compression-mapped, becomes.

Figure 7A:
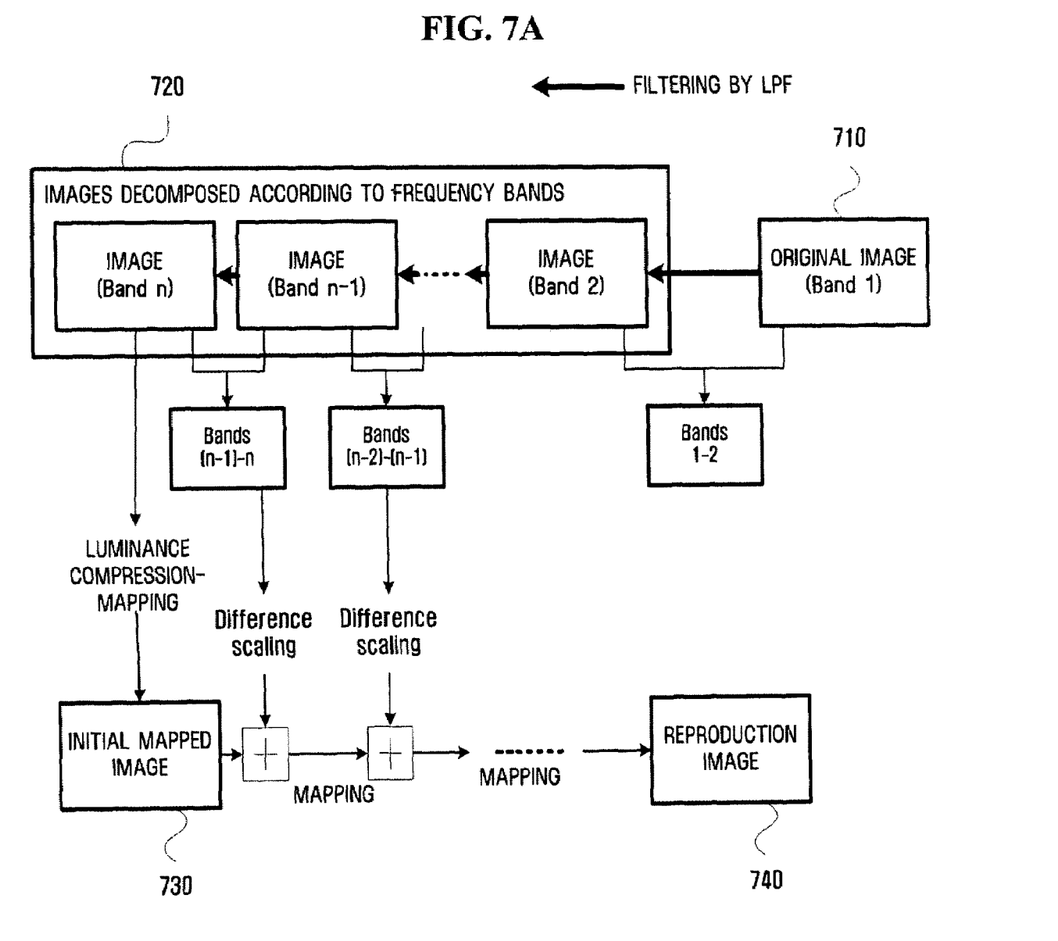
FIG. 7A is a block diagram illustrating a concept of a spatial-information-based compression algorithm in accordance with an exemplary embodiment of the present invention.
Figure 7B:
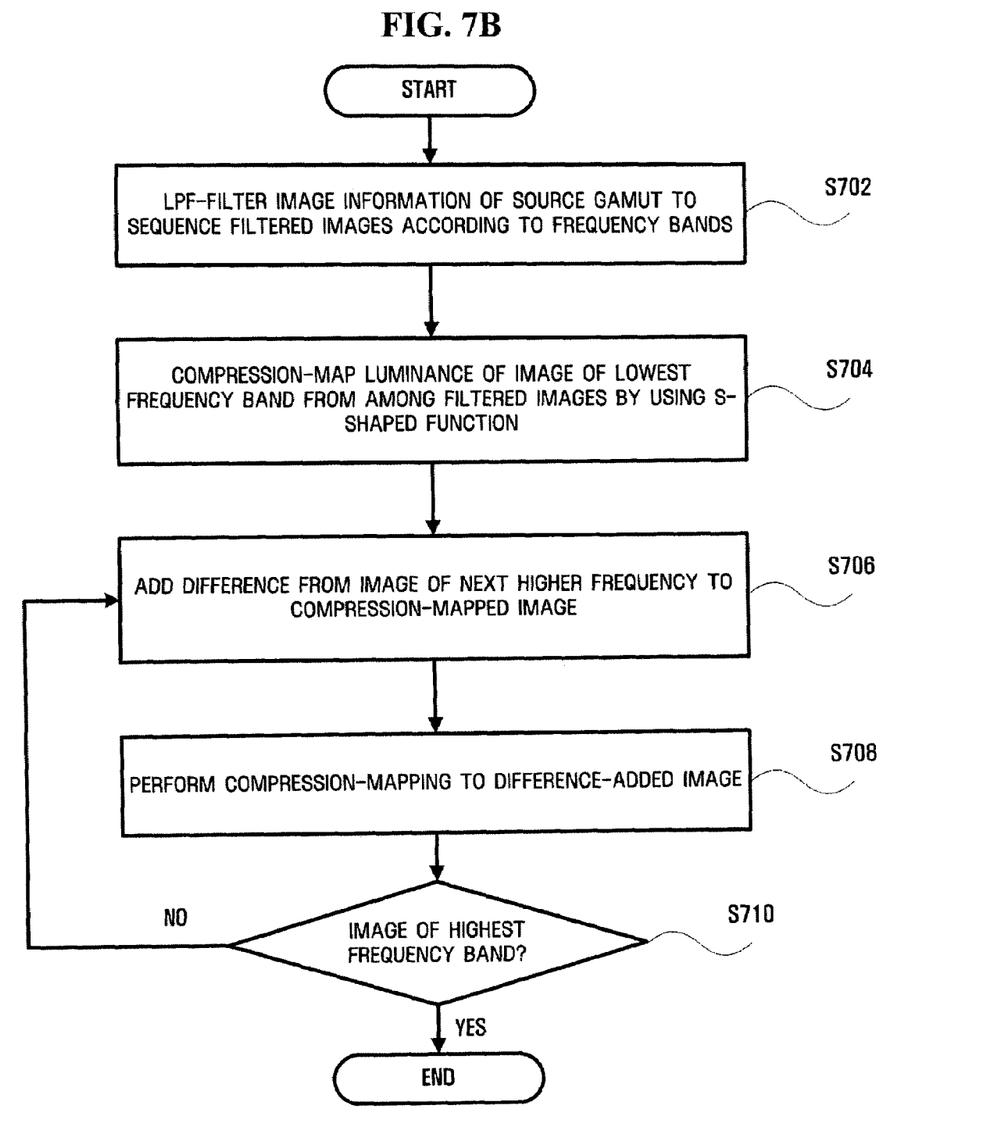
FIG. 7B is a flowchart illustrating a procedure of executing the spatial-information-based compression algorithm.

FIG. 7A illustrates a concept of a spatial-information-based compression algorithm according to an exemplary embodiment of the present invention, and FIG. 7B is a flowchart illustrating a procedure of executing the spatial-information-based compression algorithm. Reference will now be made in detail to the spatial-information-based compression algorithm with reference to FIGS. 7A and 7B.

A low-pass filter filters image information on an original image (Band 1) 710 belonging to a source gamut, which is based on L*, C* and h information converted in the conversion section 210, to generate an image pyramid 720 in which images are sequenced according to frequency bands in operation S702. As seen from FIG. 7A, which illustrates the image pyramid 720 together with the original image (Band 1) 710, the image pyramid 720 consists of images Band 2 . . . Band n−1 and Band n decomposed according to frequency bands. Using an S-shaped function as presented in Equation 1, compression mapping to a luminance channel of the image Band n, which is an image of the lowest frequency band in the filtered image pyramid 720, is performed to generate an initial mapped image 730 in operation S704. Then, a difference between the image Band n of the lowest frequency band and the image Band n−1 of the next frequency band, i.e., Bands (n−1)-n, is scaled, and the scaled difference is added to the compressed initial mapped image 730 in operation S706. Compression mapping to the resultant added image is performed using the S-shaped function again in operation S708, a difference between the image Band n−1 and the image Band n−2 of the next higher frequency band, i.e., Bands (n−2)-(n−1) is scaled and added to the resultant compression-mapped image, and then compression mapping to the resultant added image is further performed. In this way, the above-mentioned processes are repeatedly performed until an image of the highest frequency band in the filtered image pyramid 720 appears. Thus, whether or not the image of the highest frequency band appears is checked in operation S710, and the procedure returns to operation S706 if the image of the highest frequency band does not appear. However, if the image of the highest frequency band does appear in operation S710, then a reproduction image 740 is generated, and with this operation, the algorithm ends.

As discussed above, the image compression unit 200 calculates total nine sets of compressed image information $L^*_1$, $C^*_1$, $h_1$, $L^*_2$, $C^*_2$, $h_2$, $L^*_3$, $C^*_3$ and $h_3$, that is, the image compression unit 200 calculates three sets of compressed image information through the minimum distance clipping algorithm, $L^*_1$, $C^*_1$, $h_1$, calculates three sets of compressed image information through the variable region compression algorithm, $L^*_2$, $C^*_2$, $h_2$, and calculates three sets of compressed image information through the spatial-information-based compression algorithm, $L^*_3$, $C^*_3$, $h_3$, and the so-calculated compressed image information sets are input into the image information reproduction unit 300.

Figure 8A:
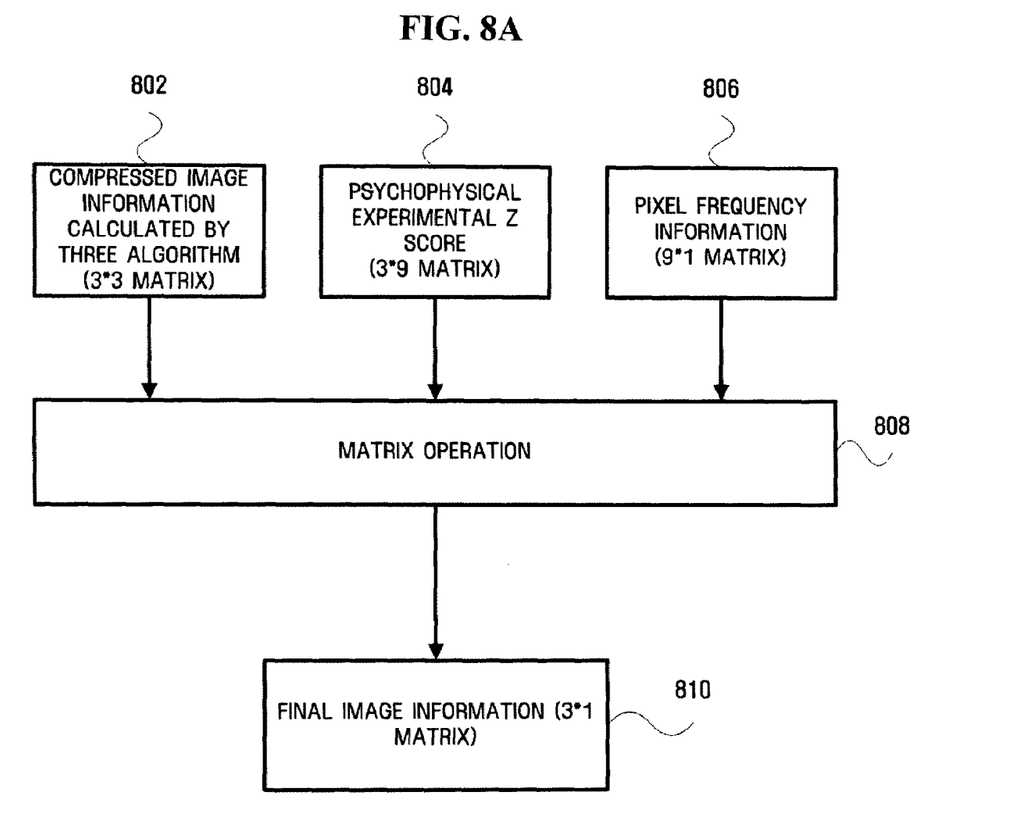
FIGS. 8A and 8B are views mathematically illustrating an operation of an image information reproduction unit in accordance with an exemplary embodiment of the present invention.
Figure 8B:
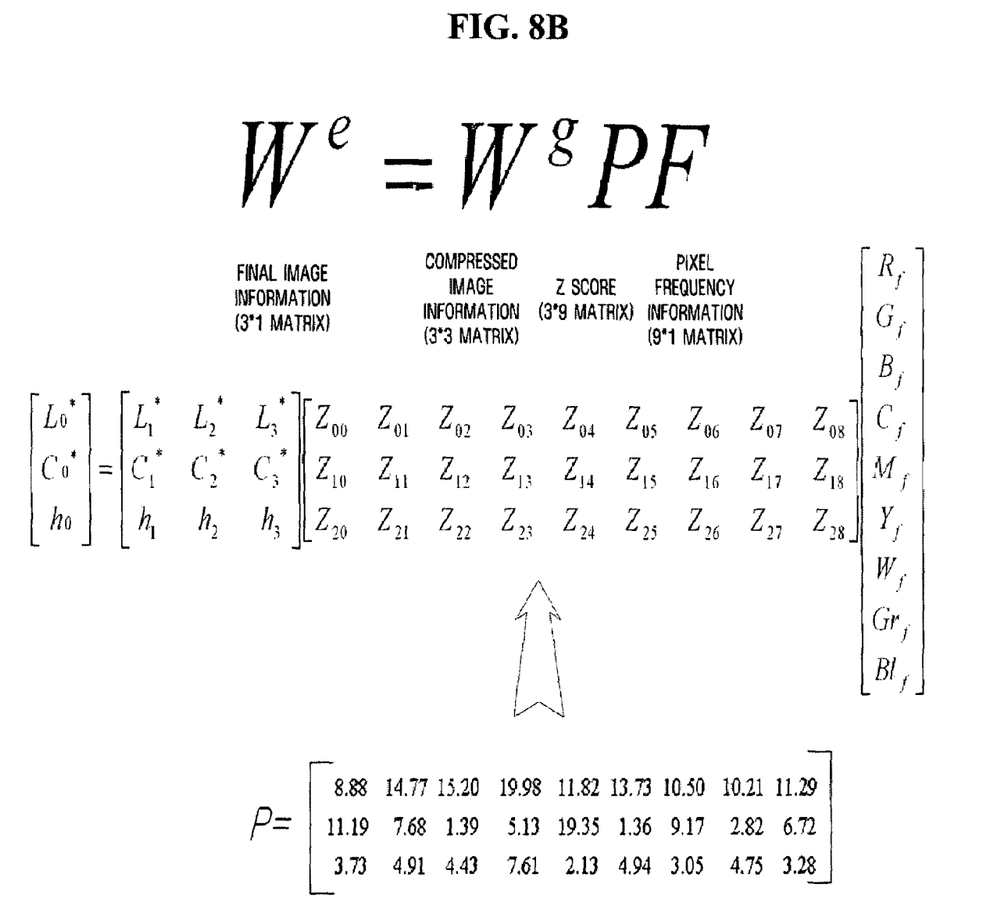

FIGS. 8A and 8B mathematically illustrate an operation of an image information reproduction unit according to an exemplary embodiment of the present invention.

First, in FIG. 8A which illustrates the operation of the image information reproduction unit 300, the image information reproduction unit 300 performs matrix operations for compressed image information 802 input from the image compression unit 200, image attribute information, that is, pixel frequency information 806 input from the information-extraction unit 100, and a psychophysical experimental Z score 804, thereby outputting final image information 810 in which the respective information sets are taken into account.

More specifically, the image information reproduction unit 300 generates a 3*3 matrix $W^g$ of a total of nine sets of compressed image information calculated based on the three compression algorithms in the image compression unit 200, generates a 3*9 weight matrix P, whose constituent elements are psychophysical experimental Z score sensitivities, and generates a 9*1 matrix F of image attribute information from pixel frequency information $R_f$, $G_f$, $B_f$, $C_f$, $M_f$, $Y_f$, $W_f$, $Gr_f$ and $Bl_f$ extracted in the information-extraction unit 100, and the respective generated matrixes are multiplied by each other. As a result of this, final image information 810 representing desired color attributes is output.

Here, the compressed image information $L^*_1$, $C^*_1$, $h_1$, $L^*_2$, $C^*_2$, $h_2$, $L^*_3$, $C^*_3$ and $h_3$ of the 3*3 matrix expressed by $W^g$ have color attributes of compression-mapped images. Also, the weight matrix expressed by P is derived from psychophysical experimental methods, and may be considered as a kind of weight matrix expressed by the psychophysical sensitivities of human perception for respective algorithms applied to any image. In this exemplary embodiment of the present invention, a 3*3 matrix expressed by specific numerical values is exemplified as the P matrix.

The 9*1 matrix, which is exemplified as the F matrix, is generated from the pixel frequency information $R_f$, $G_f$, $B_f$, $C_f$, $M_f$, $Y_f$, $W_f$, $Gr_f$ and $Bl_f$, which the information-extraction unit 100 extracts, and is obtained using pixel frequency distributions of pixels belonging to respective color regions divided according to predetermined criteria, and reflects image attributes in the final image information 810. In this way, since the final image information 810 has characteristics in which the image attributes are reflected, it is possible to realize the image-adaptive reproduction of the present invention.

It is noted that a 3*1 matrix representing the final image information 810 output in the above-mentioned manner has elements which are expressed by $L^*_0$, $C^*_0$ and $h_0$ as illustrated in FIG. 1.

The terms "unit" and "section," as used in the description of the exemplary embodiments of the present invention included herein, may be implemented, for example, as a kind of module or table. Herein, the term "module" or "table" refers to, for example, a software component or a hardware component such as a Field Programmable Gate Array (FPGA) or an Application Specific Integrated Circuit (ASIC), which performs certain tasks, but is not limited to software or hardware. A module may be so configured as to reside on an addressable storage medium or may be so configured as to execute on one or more processors. Thus, a module may include, by way of example, components such as software components, object-oriented software components, class components and task components, processes, functions, attributes, procedures, subroutines, segments of program codes, drivers, firmware, microcode, circuitry, data, databases, data architectures, tables, arrays, and variables. The functionality provided by the components and modules may be incorporated into fewer components and modules or may be further separated into additional components and modules. Moreover, the components and modules may also be implemented so as to execute on one or more CPUs.

Figure 9:
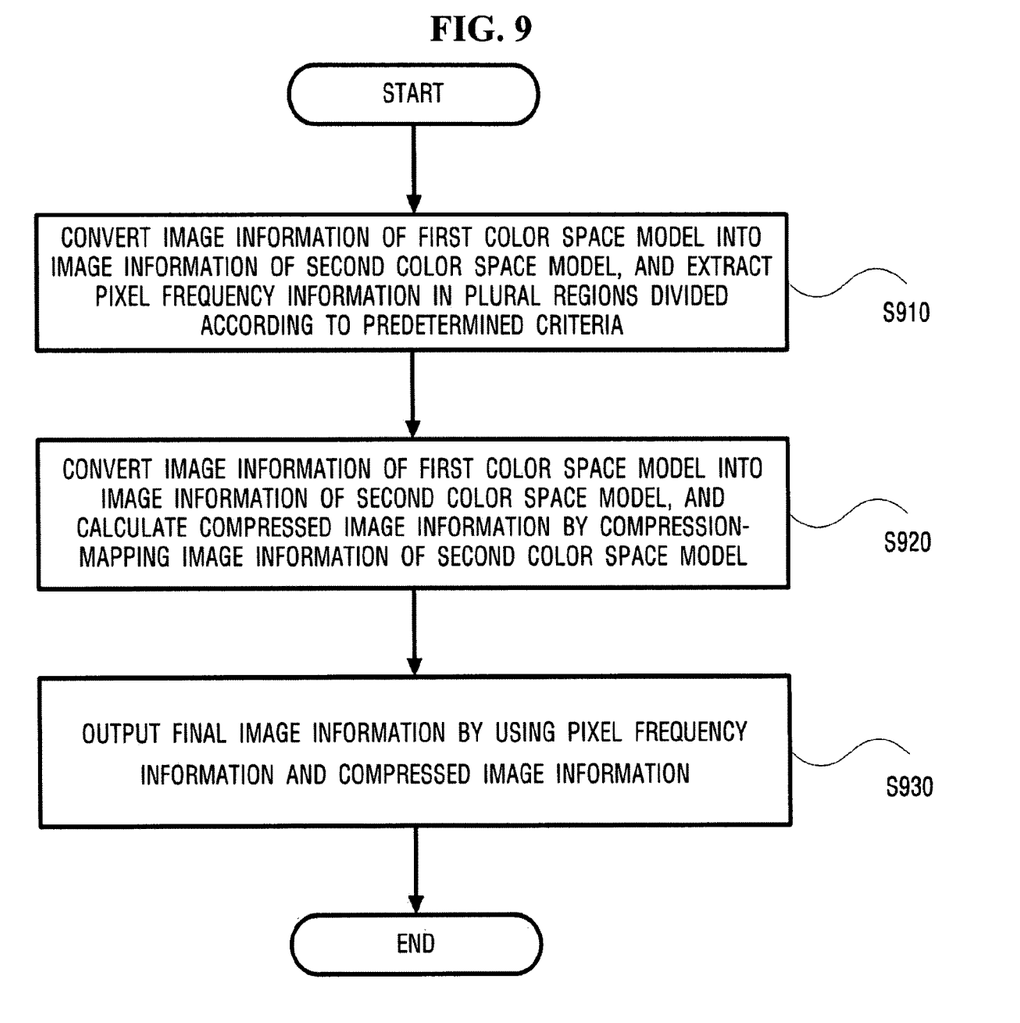
FIG. 9 is a flowchart illustrating an overall flow of a method for image-adaptive color reproduction in accordance with an exemplary embodiment of the present invention.

Now, a method for image-adaptive color reproduction according to an exemplary embodiment of the present invention will be described in chronological order with reference to FIG. 9. FIG. 9 is a flowchart illustrating an overall flow of a method for image-adaptive color reproduction according to an exemplary embodiment of the present invention.

First, the information-extraction unit 100 performs an operation of inputting image information of a first color space model converting the input image information of the first color space model into image information of a second color space model, and extracting pixel frequency information of pixels belonging to a plurality of color regions, which are divided according to predetermined criteria, by using the image information of the second color space model in operation S910. Here, as stated above, the image information of the first color space model may be, for example, R, G and B values of an RGB color space model, and the image information of the second color space model may be, for example, L* information, C* information and h information of a CIE_Lab color space model.

Next, the image compression unit 200 performs an operation of inputting the image information of the first color space model, converting the input image information of the first color space model into the image information of the second color space model, and calculating compressed image information by compression-mapping the image information of the second color space model in operation S920.

Finally, the image information reproduction unit 300 performs an operation of outputting final image information by using the pixel frequency information and the compressed image information in operation S930.

In addition to the forgoing, it should be apparent to those skilled in the art that the scope of the present invention includes a computer-readable recording medium in which program code for executing the inventive method is recorded.

Through an apparatus and a method for image-adaptive color reproduction according to exemplary embodiments of the present invention, as described above, optimal image-adaptive colors can be reproduced by analyzing image components and by taking harmonization with surrounding pixels into consideration.

It should be noted that effects of the present invention are not limited to those previously mentioned, and other effects not mentioned herein will be apparent to those skilled in the art from the following claims.

Although exemplary embodiments of the present invention have been described for illustrative purposes, those skilled in the art will appreciate that various modifications, additions and substitutions are possible, without departing from the essential features and the scope and spirit of the invention as disclosed in the accompanying claims. Therefore, it should be appreciated that the exemplary embodiments described above are not limitative, but only illustrative.

What is claimed is:

1. An apparatus for image-adaptive color reproduction, the apparatus comprising:
    an information-extraction unit which inputs image information of a first color space model, converts the input image information of the first color space model into image information of a second color space model, and extracts pixel frequency information of pixels belonging to a plurality of color regions, which are divided according to criteria, using the image information of the second color space model;
    an image-compression unit which inputs the image information of the first color space model, converts the input image information of the first color space model into the image information of the second color space model, and calculates compressed image information by compression-mapping the image information of the second color space model; and
    an image-information-reproduction unit which outputs final image information by using the pixel frequency information and the compressed image information.

2. The apparatus of claim 1, wherein the image information of the first color space model comprises red (R), green (G) and blue (B) values of an RGB color space model, and
    wherein the image information of the second color space model comprises luminance (L*), chroma (C*) and hue (h) information of a Commission Internationale d'Eclairage (CIE)_Lab color space model.

3. The apparatus of claim 2, wherein the information-extraction unit comprises:
    a conversion section which converts the R, G and B values, which are input from an original image, into the L*, C* and h information of the CIE_Lab color space model by using a CIE standard conversion formula;
    a division section which divides the second color space model into nine color regions of Red (R), Yellow (Y), Green (G), Cyan (C), Blue (B), Magenta (M), White (W), Grey (Gr) and Black (Bl) using the luminance and hue information, and subdivides each of the nine color regions into at least a high chroma region, a middle chroma region and a low chroma region using the chroma information; and
    a pixel-frequency-information extraction section which calculates pixel frequency distributions of pixels belonging to the nine color regions, and extracts pixel frequency information of pixels belonging to the high chroma region and the middle chroma region, but excludes the low chroma region.

4. The apparatus of claim 2, wherein the image compression unit comprises:
a conversion section which converts the R, G and B values, which are input from an original image, into the L*, C* and h information of the CIE_Lab color space model using a CIE standard conversion formula; and
a compressed image information calculation section which compression-maps the L*, C* and h information by using a minimum distance clipping algorithm, a variable region compression algorithm and a spatial-information-based compression algorithm, respectively, thereby calculating nine sets of compressed image information.

5. The apparatus of claim 4, wherein the minimum distance clipping algorithm comprises an algorithm according to which, from among image information of a source gamut, which is based on the luminance, chroma and hue information, image information of the source gamut existing outside of a destination gamut boundary is clipping-mapped to a point on the destination gamut boundary, at which differences of the luminance and the chroma of the source gamut and the destination gamut boundary are minimized, while the hue information remains constant.

6. The apparatus of claim 4, wherein the variable region compression algorithm comprises an algorithm according to which, from among image information of a source gamut, which is based on the luminance, chroma and hue information, the luminance is mapped using an S-shaped function, and the luminance and the chroma are compression-mapped to a point on a luminance axis, which has a same luminance value as that of a Cusp point of a reproduction gamut.

7. The apparatus of claim 4, wherein the spatial-information-based compression algorithm comprises an algorithm according to which:
image information of a source gamut, which is based on the luminance, chroma and hue information, is filtered using a low-pass filter and filtered images are thereby arranged in sequence according to frequency bands,
a luminance of an image of a lowest frequency band, from among the filtered images, is compression-mapped using an S-shaped function so as to generate a compression-mapped image,
a difference between the image of the lowest frequency band and an image of a second frequency band, which is a next higher frequency band relative to the lowest frequency band, from among the filtered images, is added to the compression-mapped image thereby generating a resultant added image, and then the resultant added image is compression-mapped using the S-shaped function thereby generating a compression-mapped resultant added image, and
if the image of the second frequency band does not comprise an image of a highest frequency band, from among the filtered images, then adding a difference between the image of the second frequency band and a third frequency band, which is a next higher frequency band relative to the second frequency band, from among the filtered images, thereby generating a second resultant added image, and then the second result added image is compression-mapped using the S-shaped function thereby generating a second compression-mapped resultant added image.

8. The apparatus of claim 2, wherein the image-information-reproduction unit outputs the final image information by multiplying a matrix, which is generated from the compressed image information, by a psychophysical experimental weight matrix and a matrix generated from the pixel frequency information.

9. A method for image-adaptive color reproduction, the method comprising:
inputting image information of a first color space model;
using a circuit or processor for converting the input image information of the first color space model into image information of a second color space model;
extracting pixel frequency information of pixels belonging to a plurality of color regions, which are divided according to predetermined criteria, by using the image information of the second color space model;
calculating compressed image information by compression-mapping the image information of the second color space model; and
outputting final image information by using the pixel frequency information and the compressed image information.

10. The method of claim 9, wherein the image information of the first color space model comprises red (R), green (G) and blue (B) values of an RGB color space model, and
wherein the image information of the second color space model comprises luminance (L*), chroma (C*) and hue (h) information of a Commission Internationale d'Eclairage Lab (CIE_Lab) color space model.

11. The method of claim 10, further comprising:
converting the R, G and B values, which are input from an original image, into the luminance (L*), chroma (C*) and hue (h) information of the CIE_Lab color space model using a CIE standard conversion formula;
dividing the second color space model into nine color regions of Red (R), Yellow (Y), Green (G), Cyan (C), Blue (B), Magenta (M), White (W), Grey (Gr) and Black (Bl) using the luminance and hue information;
subdividing each of the nine color regions into at least a high chroma region, a middle chroma region and a low chroma region using the chroma information;
calculating pixel frequency distributions of pixels belonging to the nine color regions; and
extracting pixel frequency information of pixels belonging to the high chroma region and the middle chroma region, but excluding the low chroma region.

12. The method of claim 10, further comprising:
converting the R, G and B values, which are input from an original image, into the L*, C* and h information of the CIE_Lab color space model by means of a CIE standard conversion formula; and
compression-mapping the L*, C* and h information by using a minimum distance clipping algorithm, a variable region compression algorithm and a spatial-information-based compression algorithm, respectively, thereby calculating nine sets of compressed image information.

13. The method of claim 12, wherein the minimum distance clipping algorithm comprises an algorithm according to which, from among image information of a source gamut, which is based on the L*, C* and h information, image information of the source gamut existing outside of a destination gamut boundary is clipping-mapped to a point on the destination gamut boundary, at which differences of the luminance and the chroma of the source gamut and the destination gamut boundary are minimized, while the hue information remains constant.

14. The method of claim 12, wherein the variable region compression algorithm comprises an algorithm according to which, from among image information of a source gamut, which is based on the luminance, chroma and hue information, the luminance is mapped using an S-shaped function, and the luminance and the chroma are compression-mapped to a point on a luminance axis, which has a same luminance value as that of a Cusp point of a reproduction gamut.

15. The method of claim 12, wherein the spatial-information-based compression algorithm comprises an algorithm according to which:

image information of a source gamut, which is based on the luminance, chroma and hue information, is filtered using a low-pass filter and filtered images are thereby arranged in sequence according to frequency bands, a luminance of an image of a lowest frequency band, from among the filtered images, is compression-mapped using an S-shaped function so as to generate a compression-mapped image, a difference between the image of the lowest frequency band and an image of a second frequency band, which is a next higher frequency band relative to the lowest frequency band, from among the filtered images, is added to the compression-mapped image, thereby generating a resultant added image, and then the resultant added image is compression-mapped using the S-shaped function thereby generating a compression-mapped resultant added image, and if the image of the second frequency band does not comprise an image of a highest frequency band, from among the filtered images, then adding a difference between the image of the second frequency band and a third frequency band, which is a next higher frequency band relative to the second frequency band, from among the filtered images, thereby generating a second resultant added image, and then the second result added image is compression-mapped using the S-shaped function thereby generating a second compression-mapped resultant added image.

16. The method of claim 10, further comprising outputting the final image information by multiplying a matrix, which is generated from the compressed image information, by a psychophysical experimental weight matrix and a matrix generated from the pixel frequency information.

17. A computer-readable recording medium having recorded thereon a program code for executing a method, the method comprising:

inputting image information of a first color space model;

converting the input image information of the first color space model into image information of a second color space model;

extracting pixel frequency information of pixels belonging to a plurality of color regions, which are divided according to predetermined criteria, by using the image information of the second color space model;

calculating compressed image information by compression-mapping the image information of the second color space model; and outputting final image information by using the pixel frequency information and the compressed image information.

* * * * *